United States Patent [19]

Barch et al.

[11] 4,370,157
[45] Jan. 25, 1983

[54] STABLE SIZING COMPOSITIONS USED DURING FORMING OF GLASS FIBERS AND RESULTING FIBER

[75] Inventors: Herbert W. Barch, Natrona Heights; Carl A. Melle, Gibsonia; Donald E. McWilliams, Pittsburgh; Howard J. Hudson, Braddock, all of Pa.

[73] Assignee: PPG Industries, Inc., Pittsburgh, Pa.

[21] Appl. No.: 335,440

[22] Filed: Dec. 29, 1981

Related U.S. Application Data

[60] Continuation of Ser. No. 242,098, Mar. 9, 1981, abandoned, which is a division of Ser. No. 22,674, Mar. 22, 1979, abandoned.

[51] Int. Cl.³ .............................................. C03C 25/02
[52] U.S. Cl. .................................... 65/3.43; 65/3.44; 427/178; 428/289; 428/378; 428/429; 428/430; 525/168; 525/444; 523/209; 524/594
[58] Field of Search ................. 65/3.43, 3.44; 260/29.2 UA; 427/178; 428/289, 378, 429, 430; 525/168, 444

[56] References Cited

U.S. PATENT DOCUMENTS

| | | | |
|---|---|---|---|
| 2,723,215 | 11/1955 | Biefeld et al. | 154/91 |
| 2,763,573 | 9/1956 | Biefeld | 525/36 |
| 2,846,348 | 8/1958 | Marzocchi et al. | 154/90 |
| 2,951,772 | 9/1960 | Marzocchi et al. | 117/126 |
| 3,464,942 | 9/1969 | Hathwar | 260/22 |
| 3,709,846 | 1/1973 | Tsou | 260/18 EP |
| 3,920,596 | 11/1975 | Furukawa et al. | 260/22 R |
| 3,936,285 | 2/1976 | Maaghul | 428/378 |
| 4,004,062 | 1/1977 | Peterson | 428/383 |
| 4,065,417 | 12/1977 | Wong | 260/17.4 CL |
| 4,067,835 | 1/1978 | Takamori et al. | 260/22 R |
| 4,122,074 | 10/1978 | Pepe et al. | 526/26 |

OTHER PUBLICATIONS

"Improved Silane Containing Sizes for Polyolefin Compatible Reinforcement", Marsden, 1970 (pp. 1–5) Society of the Plastics Industry.

*Primary Examiner*—Robert L. Lindsay, Jr.
*Attorney, Agent, or Firm*—Kenneth J. Stachel

[57] ABSTRACT

Glass fiber sizing compositions and methods of making same and glass fibers containing dried residue of the sizing composition are provided that yield improved efficiencies, reduced migration, reduction in drying conditions, reduced cleaning time and improved housekeeping. The sizing composition, method and glass fiber strand involves the use of a high solids sizing composition having a water solubilized, condensation, crosslinkable, unsaturated polyester resin having free carboxyl groups either pendant or terminal or pendant and terminal and an amino-containing silane and an amount of water to yield a sizing composition having an amount of total solids in the range of about 18 to about 40 weight percent. In addition, other additives can be included in the sizing composition such as additional polyester resins, additional coupling agents, thermoplastic polymers, anti-static agents, film-former modifiers, wetting agents, stabilizers and lubricants.

4 Claims, No Drawings

STABLE SIZING COMPOSITIONS USED DURING FORMING OF GLASS FIBERS AND RESULTING FIBER

This is a continuation of application Ser. No. 242,098, filed Mar. 9, 1981 which is a division of U.S. Ser. No. 22,674, filed Mar. 22, 1979 which was abandoned June 4, 1981 both now abandoned.

BACKGROUND OF INVENTION

This invention is directed to stable sizing compositions, wherein the film-former is a polyester resin with free carboxyl side and/or end groups; and to a method of making said sizing composition in order to permit more efficient use of the sizing composition in treating glass fibers.

Typically glass fiber strands are produced by combining a multitude of fine glass filaments that are formed by the rapid attenuation from molten cones of glass at the tips of small orifices in a bushing. An example of such an operation is shown in U.S. Pat. No. 2,133,238. In order to protect the glass filaments from interfilament abrasion, the filaments are coated during their formation with a sizing composition which contains a lubricant to protect the glass fiber strand against handling equipment during further processing. The size also contains a binder to give the glass fiber strand integrity and workability for any standard textile or reinforcement use. In addition the size contains a coupling agent to improve the interfacial bond between the glass and matrix resin that the glass is to reinforce. After the filaments have been treated with the size composition and gathered together into a strand the glass fiber strand is wound around a rapidly rotating drum to form a package.

Over the years the development of sizes has progressed so that the use of glass fibers to reinforce thermoplastic and thermosetting polymers is well accepted. The usefulness of glass fibers as a reinforcement for plastics relies on the efficient transfer of stresses from the relatively weak polymers constituting the matrix to the much stronger glass fibers. For an efficient transfer of stresses to occur there must be a good adhesion between the matrix and the surface of the glass fiber reinforcement. In order to obtain good adhesion between the matrix and the surface of the glass, the sizing composition must overcome the hydrophobic tendencies of the polymer sizing and the hydrophilic tendencies of the glass surface.

To accomplish the objectives of providing the desired handling characteristics of the glass fiber strands and performance characteristics for adapting glass fibers as reinforcement for polymeric materials, sizing compositions contain several components. These include a film former that is soluble and compatible with the polymeric material to be reinforced, lubricant, coupling agent, and additives.

Coupling agents that have been used include Werner complex compounds and organo-silicon compounds. These compounds coordinate or react with groupings on the glass fiber surface and the polymeric material by a tie-in type bond. The unsaturated organo-silicon compounds such as silanes or polysiloxanes accomplish this result because the silicon atom has attached to it one or more groups which can react with the glass surface resulting in the removal of hydroxyl groups and one or more groups which bonds with the resin during its polymerization to produce a chemical bridge between the glass surface and the polymer.

The film former assists in incorporating the coupling agents into the sizing composition. The film former is a flexible constituent of the size that bonds the filaments together in a unit to give the filaments increased abrasion resistance during processing and handling. The best film formers available for the size composition are those that allow maximum adhesion between the glass fiber and the polymeric material by allowing the coupling agent to be in intimate contact with the glass fiber surface and the polymeric material. These types of film-formers are those that are soluble or compatible with the polymeric material thereby resulting in better wet-out of the fibers with the resinous material. A myriad of sundry film-formers having these properties have been developed by the art; for example, film-formers having polyester resin systems ranging from only the polyester resin to the polyester resin in addition with plasticizers and thermoplastic resins. The art has also recognized that when the polyester resin system has pendant carboxyl groups, such as those produced by the polymerization product of trimellitic anhydride or acid with an alcohol or glycol, the properties of the glass fiber reinforced polymer are improved. In addition, it has been suggested by the art that the bonding relationship between the resinous material and the glass fibers can be improved by having a sizing composition containing a film-former reaction product of a polyester resin film former with ethylenic unsaturation and a mercapto silane.

Typically the sizing composition is applied to the glass fibers during formation in a sizing solution having a total solids content of about 2 to 20 percent by weight. The total solids content of some polyester systems such as those containing a plasticizer have been reported to be as high as 23 percent by weight, but the usual total solids content of the sizing solution is around 5 to 17 percent by weight.

The quantity of sizing deposited on the glass fibers when a water soluble size is used, usually varies in loss on ignition of the strand between 0.6 percent on the interior of the forming package to 3.5 percent on the exterior of the forming package. The loss on ignition is a method of determining the quantity of size deposited on the glass fiber and involves taking a sample of glass fiber strand approximately around 11 meters, drying it at 110° C. to constant weight, then burning off the sizing at a temperature of around 620° to 640° C.; the change in weight gives the quantity of sizing deposited on the glass fiber strand.

To produce a glass fiber strand with the desired quantity of sizing deposited on the strand by (LOI) loss on ignition, the total solids content of the sizing composition should not be too low. If the solids content of the sizing composition is too low, the water content of the formed glass fiber strand package will be too high and will require longer times in the drying process. In a forming package the water is usually concentrated in the interior of the package, and the weight of the forming package minus any structural winding element should be such that the layer of glass fibers is limited to a thickness of not more than 25 millimeters. When the glass fibers are to be used in the reinforcement of polymers, water can act as a plasticizer of the film-former, and impart handling characteristics to the strand which can be unsuitable. An example of such an unsuitable characteristic is where a fiber which is expected to be springy may turn out to be too limp if there is too much water present. In addition having too low of a solids content of a sizing leads to several disadvantageous results. For example, the efficiency of the use of the sizing composition is reduced, since the use of a sizing composition containing low solids and more water will lead to loss of the sizing composition during the forming and winding of the glass fiber strand due to the throw-off of the sizing composition during these operations. In addition when the water content of the sizing composition is high there is an increased opportunity for migration of the sizing composition from the inside to the outside of the forming package during drying. A further disadvantage of having a sizing composition with too high a water content is that it leads to longer drying times or higher drying or curing temperatures. Furthermore the use of a sizing composition having a high water content can be sloppy to work with and more difficult to clean up.

When a polyester resin system containing pendant carboxyl groups is used in the sizing composition, care must be exercised not to have too high a solids content in the sizing composition. If too high of a solids content is used, the size has a tendency to be unstable and to have material come out of solution.

It is an object of the present invention to provide a sizing composition which leads to higher sizing composition use efficiencies for the sizing composition by reducing the amount of throw-off during the forming and winding and gathering operations in the production of glass fiber strands.

It is an additional object of the present invention to provide a sizing composition for treating glass fibers that reduces the opportunity for migration in forming packages during drying.

It is an another object of the present invention to provide a sizing composition for treating glass fibers that requires lower or reduced drying or curing temperatures and time because of a reduced moisture content.

It is a further object of the present invention to provide a glass fiber sizing composition that improves housekeeping during formation of the glass fiber strands and lessens the time required for cleaning up the area around where the glass fiber strands are produced.

It is another additional object of the present invention to provide a sizing composition for treating glass fibers that has the capability of yielding treated glass fibers having LOIs greater than 3.5 percent.

It is a further additional object of the present invention to provide a sizing composition for treating glass fibers and a method of producing the sizing composition with good stability for original use and for recirculated use as a sizing composition for treating glass fibers.

SUMMARY OF THE INVENTION

It has been suprisingly discovered that the above objects are achieved with the high solids sizing composition and method of making same of the present invention. The high solids sizing composition of the present invention comprises the reaction product of a polyester resin having free carboxyl side and/or end groups, and an unhydrolyzed or partially hydrolyzed silane with an amino-functionality; and water in an amount to give a total solids of the sizing composition in the range of about 18 to about 40 weight percent.

The polyester resin film-former with terminal and/or pendant carboxyl groups can be used in the form of a bulk polymer (concentrated form,) or in a solution with less than 90 percent water, or with an organic solvent which is removed from the sizing composition before treating glass fibers. The polyester resin can be made from any of the known polyester resin-forming compounds such as anhydrides and organic acids reacted with hydroxyl-containing compounds like glycols wherein one or more additional carboxyl groups are present on the polyester resin forming compound or the hydroxyl-containing compound. The polyester resin may be formed from a mixture of polyester resin forming compounds wherein one of the compounds contains the additional carboxyl group and/or a mixture of hydroxyl-containing compounds that may or may not contain the additional carboxyl group.

The unhydrolyzed or partially hydrolyzed silane with the amino functionality can be any of the amino-functional silanes known to those skilled in the art for use in glass fiber sizing compositions. The amino silane is used in the unhydrolyzed or partially hydrolyzed state. In the past amino silanes were usually hydrolyzed before addition to the polyester resin film former so that the silanol compound was readily available for bonding to the surface of the glass fibers. The present invention recognizes the fact that stability problems are caused in the sizing composition when fully hydrolyzed amino-functional silanes are added to the polyester resin containing pendant carboxyl groups. In the unhydrolized state the amino silane does not contain hydroxyl groups attached to the silicon atom. By the partially hydrolyzed state, it is meant that the silane has been contacted with aqueous solution for a short period of time before being combined with the polyester resin to produce a mixture of silanes where a substantial amount of the silanes have no more than two hydroxyl groups attached to the silicon atom. When the silicon atom is not attached to hydroxyl groups, the groups that are attached to the silicon atom are alkyloxy groups having from 1 to 5 carbon atoms. The unhydrolyzed or partially hydrolyzed amino-functional silane may be a mixture of amino-functional silanes that are unhydrolyzed or contain less than three hydroxyl groups attached to the silicon atom.

The polyester resin and the amino-functional silane in the unhydrolyzed or partially hydrolyzed state are generally contacted at the conditions of temperature and pressure and in a reaction vessel that are well known to those skilled in the art. The conditions that are well known to those skilled in the art that cannot be used in contacting the polyester resin and the amino-functional silane are any conditions that would favor the hydrolysis reaction of the silane rather than the reaction between the silane and the polyester to produce a salt. It has been discovered that the reaction rate of the salt formation reaction between the amine group of the amino-silane and the pendant and/or terminal carboxyl group of the polyester resin is faster than the hydrolysis reaction of the amino-silane. Therefore, any conditions that would favor overall the hydrolysis reaction over the salt formation reaction cannot be used. Conditions that favor the salt formation reaction over the hydrolysis reaction must be used. Such conditions include adding the unhydrolyzed amino-silane rather than the hydrolyzed amino silane to the polyester resin containing free carboxyl groups. Another condition is to maintain a concentration of at least around 10 weight percent of the polyester in aqueous solution when the amino-silane is added to the aqueous solution of polyester. All of the conditions favoring the salt formation reaction need not be used at the same time. For example, the unhydrolyzed silane can be added to an aqueous solution having as low as 10 percent by weight solids of the polyester resin having free carboxyl groups. In addition when the amino-functional silane is partially hydrolyzed and the polyester resin is in an aqueous solution the polyester resin should be concentrated in the aqueous solution wherein the solids content of the resin is at least around 30 weight percent. In general the larger the number of hydroxyl groups attached to the silicon atom the more concentrated the polyester resinshould be in order to limit the opportunity of the partially hydrolyzed silane to achieve full hydrolyzation.

In addition to the polyester resin film-former that has free pendant and/or terminal carboxyl groups and the unhydrolyzed or partially hydrolyzed amino functional silane present in the size composition other additives can be included that lend additional properties to the sizing composition. These additives can function as film-former modifiers, wetting agents, anti-static agents, additional coupling agents, additional film-formers, stabilizers, etc. that are well known in the art. When an additional additive such as another film-former or film-former modifier that is polyester resin is added to the size composition, an amount of the unhydrolyzed or partially hydrolyzed amino functional silane may be added to the additional polyester resin while the remaining amount is added to the polyester resin with the pendant carboxyl groups. Generally the proportions of all the additives including the film-former polyester resin having pendant carboxyl groups and the unhydrolyzed or partially hydrolyzed amino-functional silane used in the size composition of the present invention are those that are known in the art, because the amounts of all of the additives present in the size composition of the present invention are increased because the amount of water added to the size composition is decreased to that necessary to give a total solids content in the range of about 18 weight percent to about 40 weight percent.

The method of the present invention involves adding the unhydrolyzed or partially hydrolyzed amino-functional silane directly to the reactants, but never adding the total amount of polyester resin having the free carboxyl groups to an aqueous solution having the total amount of amino-functional silane. The silane can be contacted with the reactants and additives in an aqueous solution to produce the desired solids content, or the silane can be contacted with the polyester or the polyester and other additives in a concentrated solution and then dilute the solution to the desired solids content.

DETAILED DESCRIPTION OF THE INVENTION

It is believed but the composition and method of the present invention is not limited by this belief that the composition and method are based on the different rates of reaction occurring between the reaction of the amino-functional silane and the polyester resin having pendant and/or terminal carboxyl groups and the reaction of the unhydrolyzed or partially hydrolyzed amino-functional silane with water. To achieve the benefits of a high solids content size composition, the coupling agent, silane, would be added to a mixture containing a high solids concentration of the polyester resin. If the amino-functional silane is hydrolyzed as in usual commercial practice, the hydroxyl groups that are attached to the silicon atom through the hydrolysis reaction and that are necessary in order to bond the coupling agent to the glass surface, may react with each other to form dimer compounds of amino-functional silane. Then the amine groups on the silane molecule will react with the carboxyl groups of the polyester to form a molecule that will precipitate out of solution. This precipitation would cause the size composition to be unstable and also is an inefficient use of the silane compound since the silanol compounds are attached to each other rather than being available for bonding with the glass surface. With the higher concentration of polyester resin present in the high solids size composition the opportunity is increased for the hydrolyzed silanol dimer compounds to tie up the polyester resin compounds into a macromolecule that will precipitate from solution.

In order to overcome the stability problem it is believed that the amino-functional silane should react with the carboxyl group of the polyester resin before the silane is fully hydrolyzed to have the maximum amount of hydroxyl groups attached to the silicon atom in order that the silane can be bonded to the glass surface. Even though some of the amino functional silane in unhydrolyzed form may become fully hydrolyzed when added to the polyester resin with free carboxyl groups in an aqueous solution, it is believed that reacting the amino-substituted silane in unhydrolyzed or only partially hydrolyzed form with the polyester resin having pendant and/or terminal carboxyl groups favors the production of a silyated polyester resin film-former rather than silane dimer. Such reaction will decrease the opportunity for the hydroxyl group, if any, on a silane molecule to form the silane dimers and therefore decrease the chances that a precipitate will settle out of solution, since the silylated polyester resin film-former that is formed is not as large a macromolecule as a silylated dimer polyester resin macromolecule. Once the silylated polyester resin film-former is produced the mixture may be diluted in order to form the hydroxyl groups or more of the hydroxyl groups by hydrolysis of the silane portion of the silylated polyester resin compound in order to make available the hydroxyl groups for bonding with the glass surface.

An amount of water may be present during the reaction of the amino-substituted silane with the polyester resin having pendant and/or terminal carboxyl groups, but the amount of water should not be so much as to favor the reaction of hydrolysis between two silane compounds over the reaction of the silane compound through amino functionality with the carboxyl group of the polyester resin. The amount of water present should be even less if the amino functional silane is partially hydrolyzed. In any event, the amount of water present with the polyester resin should not exceed 90 percent of the polyester resin water mixture, or in other words the polyester resin should not be less than a 10 percent solids content when reacted with the amino-substituted silane that is either unhydrolyzed or only partially hydrolyzed.

The polyester resin with pendant and/or terminal carboxyl groups is present in the size composition in an amount from about 1 to about 10 percent by weight of the total solids in the size composition. The polyester resin can have carboxyl functionality at the end of the polymer chain, and, therefore, have terminal carboxyl functionality, as most polyesters have to some degree; or the resin can have carboxyl functionality that is pendant along the polymer chain, or the resin can have both pendant and terminal carboxyl functionality. The polyester resin can be formed from polycarboxylic acids and polyhydric alcohols by techniques known to those skilled in the art. In all cases, however, an ethylenically unsaturated polycarboxylic acid or anhydride such as maleic anhydride, maleic acid, fumaric acid or the like must be a major component in the formation of the polyester condensation product in order to impart adhesive characteristics between the glass fiber strand and the resin matrix. A typical unsaturated polyester resin has a polycarboxylic acid having more than two carboxyl groups per molecule as a component in the synthesis thereof. Therefore, because a portion of the carboxylic acid employed in the synthesis of the polyester resin has a functionality of greater than 2, a substantial amount of free carboxyl groups will be available for subsequent reaction with the amine group of the amine-substituted silane. Typically, trimellitic anhydride or trimellitic acid is used in the synthesis of the polyester resin along with maleic anhydride and a polyhydric alcohol to obtain the solubilization and condensation cross-linkable properties of the polyester.

Typical polyhydric alcohols which are used in the synthesis of the polyester resin include ethylene glycol, diethylene glycol, propylene glycols, dipropylene glycols and butylene glycols, glycerol, erythritol, sorbitol, 1,2-propylene glycol and related polyethylene and ethylene glycols.

The curing time and degree of curing of the polyester resin can be adjusted by the selection of a nitrogenous base used to solubilize the polyester resin. A high boiling amine i.e. dimethyl ethanolamine, will require substantial time and temperature to fully dissociate from the glass fiber strand, if complete cure of the size is not desired, complete dissociation of the amine will not be conducted. If a low boiling solubilizing base, e.g. ammonia is used, cure times and temperatures can be substantially reduced.

Further, other saturated dicarboxylic acids may be used in the condensation of the polyester resin. However, only a minor amount of the difunctional, saturated dicarboxylic acid may be used in order that no substantial detraction of unsaturation or pendant carboxylation in the polyester is obtained which will detract from the water solubility salt formation with the amino-silane, and the condensation cross-linking properties of the vinyl sizing composition.

In addition to this polyester resin with pendant and-/or terminal carboxyl groups, a second polyester resin can be used in the size composition. The second polyester resin would be water dispersible like the previous polyester resin, but the second polyester resin would be insoluble in the first polyester resin. The second polyester resin should not have too large an amount of pendant carboxyl groups and preferably has no pendant carboxyl groups. The second polyester resin would be added to the size composition in an amount of about 2 to about 10 percent by weight of the sizing composition. Typically this polyester is formed from maleic, fumaric, or the like previously mentioned unsaturated carboxylic acids or anhydrides and a polyhydric alcohol such as those previously mentioned, i.e., diethylene glycol, propylene glycol, and other polyhydric alcohols such as pentaerythritol or triglycerols. Further non-free radically polymerizable dicarboxylic acids may be utilized in the synthesis of the polyester in a mole ratio which does not detract from the capability of the second polyester to bond the glass fibers with the resin matrix to be subsequently applied to the surface of the glass fibers.

Further, the second polyester resin imparts non-migrating characteristics to the size.

The amino-substituted silane coupling agent is one having the amino functionality which can be designated by the general formula:

wherein R is an alkyl radical having from 2 to 8 carbon atoms and $R_2$ is a lower alkyl radical or hydrogen; the lower alkyl radical having 1 to 5 carbon atoms, preferably 1 to 2 carbon atoms. It is preferred that the amino-substituted silane coupling agent is in the unhydrolyzed form when added to the polyester resin having free carboxyl groups. It is within the scope of this invention as an alternative embodiment to add the amino-silane in a partially hydrolyzed form to the polyester having free carboxyl groups. The partially hydrolyzed amino-silane has less than three hydroxyl groups attached to the silicon. The partially hydrolyzed amino-silane is added to the polyester under conditions to favor the faster salt formation reaction as opposed to favoring the hydrolysis reaction of the partially hydrolyzed amino-silane. Also, it is within the scope of the composition and process of present invention to use a combined coupling agent system wherein two coupling agents are used and both are preferably silanes. The first coupling agent would be the one described above and the second silane coupling agent has a reactive moiety thereon which is free radically polymerizable such as acrylate, methacrylate, alkene, vinyl or the like. A particularly advantageous acrylate coupling agent is gamma-methacryloxypropyltriethoxysilane. However, other unsaturated coupling agents such as vinyl triethoxysilane, vinyl trimethoxysilane and the like may be utilized as the second coupling agent. Typically each silane coupling agent is present in the size composition in an amount of about 0.1 to about 5 percent by weight based on the total weight of the size composition.

In addition to the polyester resin with pendant and-/or terminal carboxyl groups, a second polyester resin, the amino-functional silane, or the combined coupling agent system, other additives that are conventionally used in size compositions for treating glass fibers to be used to reinforce polymers may be used in the size composition of the present invention. Nonexclusive examples of the additives that can be used in the size composition of the present invention include additional lubricants such as polyoxyethylene fatty esters, cationic active aid solubilized fatty acid amides, and other lubricants of the type normally employed in the treatment of glass fibers; and additives that function as antistats, film-former modifiers, wetting agents, stabilizers, plasticizers and flexibilizing agents, etc.

A plasticizer can be added to the size composition to impart pliability to the glass fiber strand to which the size composition is applied and to the roving that can be subsequently produced from the strand. The pliability provides assistance in the coalescense of the solids of the size composition into a continuous film, ease in processing during forming of fibers and strands, and ease in fabrication of the roving and in chopping of the roving prior to incorporation into the polymer matrix. Generally the plasticizer is incorporated into the size composition in an amount of 10 percent by weight based on the total size composition. A particularly advantageous plasticizer is tricresyl phosphate. Other plasticizers known to those skilled in the art may be utilized so long as they impart the necessary properties of flexibility and processibility necessary to the strand and roving formed therefrom and aid in the coalescence of the solids in the size composition. Typical of other plasticizers are dioctyl phthalate, dibutylphthalate, ethylorthobenzol benzoate, and the like.

A flexibilizing agent that can be used in the size composition of the present invention includes a thermoplastic polymer which is incorporated into the composition to provide a strand which is sufficiently tacky to adhere the strands together to facilitate the production of glass fiber strand roving. However, too much tack of the strand should be avoided so that the roving can be readily unwound and processed through the chopping device without filament breakage. Typical thermoplastic pressure-sensitive polymers useful for incorporation into the size composition are the low molecular weight acrylic resins. These resins are synthesized from the homopolymerization, copolymerization or interpolymerization of methyl methacrylate, ethylacrylate, 2-ethyl-hexylacrylate, butylacrylate, styrene, vinylacetate and the like. Other thermoplastic polymers may be used so long as they provide a sufficient tack level to the glass fiber strand. One polymer has been found to be particularly useful in the size of the present invention is Paisley 76-3663 which is a vinyl acrylic copolymer emulsion supplied as a 50 percent plus or minus 2 percent water emulsion having an average particle size of 0.5 microns and a viscosity of 1500 to 2000 centipoises and a pH of 6 to 7. Another polymer that has been found to be particularly useful in the size composition of the present invention in Fuller X-8731 which is a polyvinyl acetate acrylic copolymer emulsion supplied by H. B. Fuller Company, Polymene Division.

In preparing the size composition of the present invention, if the polyester resin has pendant carboxyl groups, the polyester resin can be used in bulk form or concentrated form or in a form that is diluted with water to not less than a 10 percent solids content of the resin. If a second polyester resin is used, the second polyester resin can be mixed with the first polyester resin having pendant carboxyl groups in a diluted aqueous solution to form a dispersion or in a bulk state with the first polyester resin and the bulk mixture is dispersed in an aqueous solution. It is preferred to use the second polyester resin so that the second polyester resin disperses into the already dispersed phase of the first polyester resin in water, where the water is the continuous phase. To this polyester mixture or to the polyester with free carboxyl groups either pendant and/or terminal alone, there is added the unhydrolyzed or partially hydrolyzed amino-substituted silane or a portion thereof. It is preferred to add the unhydrolyzed form of the amino-substituted silane. If a second silane coupling agent is used, it is used in the unhydrolyzed or partially hydrolyzed form and can be added with or after or before the addition of the amino-substituted silane. The second silane coupling agent, if a non-amino-substituted silane can even be added in the hydrolyzed form, and it is preferred to add this second silane coupling agent in the hydrolyzed form. After the silanes and the polyester resins have been mixed to facilitate their reaction, the additives can be added to the mixture as a dilution and enough water is added to bring the total solids content of the size composition to within the range of 18 to about 40 weight percent and to fully hydrolyze the silane material. Also the additional additives to be added to the size composition may be added directly after the addition of the silanes and all the components mixed while, before, or after the water for dilution is added. The latter approach may certainly be used where the silanes are in the unhydrolyzed form, but it is preferred to use the former approach when the silanes are partially hydrolyzed. In an alternative embodiment the unhydrolyzed or partially hydrolyzed amino-silane may be added in different portions to the two polyester resins and then combined into one mixture, and the other additives may be added to any of the portions before the combination occurs.

The size composition of the present invention is used to treat glass fibers and preferably the size composition contacts the glass fibers as they are formed. Most preferably the glass fibers are contacted with a size composition of the present invention within a few feet of the bushing and cone from which they are being drawn as more fully described in U.S. Pat. No. 3,718,449. The size composition of the present invention may also be applied by conventional roller applicators such as described in U.S. Pat. No. 2,873,718. The glass fibers are formed and wound into glass fiber strand on a forming package by the conventional method. Drying of the sized glass fiber strand may be accomplished by passing the sized strand through a microwave oven, a forced hot air oven, or through other means which impart sufficient heat to remove the water contained in the sized composition. The time and/or temperature of the drying apparatus may be less than that used when a conventional size composition containing a standard solids content is used to treat the glass fibers, since in the size composition of the present invention the high solids content of the size composition means there is less moisture to remove from the sized glass fiber strand.

Generally the sized glass fiber strand is further processed to reinforce a polymer matrix which can be one of two types of chemically thickened molding compounds which have found major utility for making articles formed therefrom. These are bulk molding compounds (BMC) and sheet molding compounds (SMC). A further description of how the sized glass fiber strands sized with the size composition of the present invention may be processed into reinforcing polymer matrices is described in U.S. Pat. No. 4,029,623 which is hereby incorporated by reference.

In the preferred embodiment of the present invenion, a two polyester resin system is used along with two coupling agents. The first polyester resin is made from trimellitic acid, isophthalic acid, maleic acid and polyhydric alcohols, and contains pendant carboxyl groups and is commercially available as Freeman 40-5018. The second polyester resin is made from maleic anhydride, phthalic anhydride, ethylene glycol and a high molecular weight polyethylene glycol, and has terminal carboxylation. A resin like this is commercially available as SELECTRON RS-5974 from PPG Industries, Inc.

In producing the stable, high solid sizing composition, additives such as polyvinylacetate acrylic copolymer (Fuller X-8731) are diluted and added to a mixing vessel. To the mixing vessel there is then added hydrolyzed gamma-methacryloxypropyltrimethoxy silane. A mixture of the second polyester resin and cationic surfactant (Abex 185) and plasticizer (Phosflex-179 A tricresylphosphate) is emulsified. To this emulsion there is added all the unhydrolyzed gamma-aminopropyltriethoxysilane that is to be used in the sizing composition. This emulsion mixture is added to the mixing vessel containing the other materials. To the materials already in the mixing vessels, there is added diluted first polyester resin to produce the sizing composition. The sizing composition is mixed and preferably contains a solids content of about 21 to about 30 weight percent.

The amounts of the components used are preferably in the following ranges:

| Component | Weight Percent |
|---|---|
| First polyester resin with pendant carboxylation | about 5 to about 15 |
| Second polyester resin with terminal carboxylation | about 5 to about 15 |
| Plasticizer | about 0. to about 1.5 |
| Methacryloxyalkyl trialkoxysilane | about 0.1 to about 1.0 |
| Gamma-aminopropyltrimethoxysilane | about 0.1 to about 1.0 |
| Polyvinylacetate acrylic copolymer | about 2 to about 7 |

Glass fiber strand treated with the sizing composition and produced in the conventional manner are dried at a temperature in the range of above 100° C. to about 150° C. for about 1 to about 20 hours. It is preferred to dry the strand at about 125° C. for a period of about 1 to 10 hours.

The following examples will further elucidate the concept of the invention and are examples of embodiments of the present invention.

EXAMPLE I

A high solids size composition was prepared from the following formulation:

| Component | Amount | |
|---|---|---|
| Portion #1 | | |
| A-74 (gamma-methacryloxypropyltrimethoxysilane) | 6.52 lbs. | (2.96 kilograms (kg)) |
| water for 174 | 7.9 gal. | (29.9 liters) |
| acidic acid | 4 ml. | |
| Total | 8.7 gal. | (32.9 liters) |
| Portion #2 | | |
| Selectron ® RS5974 polyester resin Available from PPG Industries, Inc. | 70.7 lbs. | (32.1 grams) |
| water | 15.3 gal. | (58 liters) |
| Abex 18S (cationic surfactant) | 5.90 lbs. | (2.68 kg.) |
| Phosflex-179A (tricresylphosphate) | 5.90 lbs. | (2.68 kg.) |
| After emulsification add unhydrolyzed A-1100 (gammaaminopropyltriethoxysilane) | 5.88 lbs. | (2.67 kg.) |
| Total | 25.3 gal. | (95.8 liters) |
| Portion #3 | | |
| Freeman 40-5018 (polyester resin of trimellitic acid, isophthalic acid, maleic acid and polyhydric alcohols) | 382.0 lbs. | (173.2 kg.) |
| water | 10 gal. | (37.9 liters) |
| After dilution add A1100 (gamma-aminopropyl triethoxysilane) | 5.8 lbs | (2.63 kg.) |
| Total | 56.2 gal. | (212.7 liters) |
| Portion #4 | | |
| Fuller X-8731 (polyvinylacetateacrylic copolymer) | 46.0 lbs. | (20.9 kg.) |
| Water | 5.3 gal. | (20.1 liters) |
| Total | 10.7 gal. | (40.5 liters) |
| Grand Total | 100 gal. | (387.5 liters |

In preparing the size composition from the above formulation the A-1100 silane was split so that 50 percent by weight was added to the RS5974 polyester resin portion and 50 percent was added to the Freeman 40-5018 portion. In combining the various portions, portion number four was added into a main mix tank and then portion number one was added to the main mix tank after the A-174 silane was hydrolyzed. The number two portion was then mixed into the main mix tank followed by the number three mix portion being mixed into the main mix tank. The final size composition had a solids content of 23 weight percent.

This size composition was used to treat glass fiber strands as they were formed from a bushing in a conventional manner. The glass fiber strand produced had 96 pounds per bushing hour and an LOI of 2.05. The solids pick-up by the gathering shoe that gathers the glass fibers into the glass fiber strand was 0.7 grams per 4 hours per shoe, while the separator pick-up was 18.5 grams per 24 hours per separator. This is an improvement over the usual shoe pick-up and separator pick-up value that for a size having a 15.09 weight percent solids content has a shoe pick-up in the range of around 1.8 grams per 4 hours per shoe while the separator pick-up is around 192 grams per 24 hours per separator. The glass fiber strand on the forming package was placed in an oven for 11 hours at 285° F. (141° C.) to produce a dried sized glass fiber strand capable of being produced into a roving for subsequent chopping operation in the production of SMC Products.

In addition 5 forming packages were produced in a similar manner but were post baked at 320° F. (160° C.) for 4 hours, and roving was made with high and low tension. This roving was compared in SMC evaluation with roving made without post bake and with high and low tension. The following results were obtained:

| Product | Glass Percent | Wet-Through | Wet-Out |
|---|---|---|---|
| Standard | 29.2 | 5 | 75 | 85 |
| #1 Forming Package Low Tension Post-Bake Forming Pkg. at 160° C. for 4 hours | 29.6 | 10 | 90 | 95 |
| #2 Forming Package | 29.6 | 0 | 75 | 80 |

-continued

| | Product | Glass Percent | Wet-Through | Wet-Out |
|---|---|---|---|---|
| | High Tension Post-baking | | | |
| #3 | Forming Package High Tension | 28.5 | 0 | 75 | 80 |
| #4 | Forming Package Low Tension Post-baking | 29.9 | 10 | 90 | 90 |
| #5 | Forming Package Low Tension | 29.6 | 10 | 85 | 90 |

As seen from the results in Table I, the post-baked, low tension roving was very hard and brittle and better than the standard.

EXAMPLE II

A stable high solids size composition was prepared from the following formulation:

| Component | Amount in Grams for a 5 Gallon Mix (18.9 liters) |
|---|---|
| Polyester resin of trimellitic anhydride, isophthalic acid, maleic acid available as Freeman 40-5018 | 5,860 grams |
| Amino-functional silane (A-1100) (gamma-amino propyltriethoxysilane) | 180 grams |
| Polyester resin (RS-5974) | 1,085 grams |
| Anionic surfactant Abex 18S | 90 grams |
| Tricresylphosphate Phosflex-179A | 90 grams |
| Gamma-methacryloxypropyltrimethoxysilane (A-174) | 100 grams |
| Acidic acid for A-174 | 3 drops |
| Fuller X-8731 (polyvinyl acetate acrylic copolymer) | 706 grams |

The above formulation was prepared by first diluting Freeman 40-5018 resin with enough water to keep the Freeman in solution. Afterwards concentrated, unhydrolyzed A-1100 was added slowly to the Freeman resin mix and the solution was mixed for 10 minutes or until the solution became clear. Tricresylphosphate and the surfactant were added to water, and the polyester resin RS-5974 was added slowly to this mix of tricresylphosphate and surfactant. Then this mix was added to the mixture of Freeman resin and A-1100 silane. The A-174 silane was hydrolyzed in water and three drops of acetic acid were added and then this mixture was added to the mixture of Freeman resin and RS 5974 mix. Then the polyvinyl acetate acrylic copolymer (Fuller X-8731) was diluted in water and added to the mix. Sufficient water was added to bring the total solids concentration to a value of 21 percent solids.

Glass fiber strands of the dimension K-37 were produced in a conventional manner wherein the above size composition was used to treat the glass fibers as they were leaving the bushing and being gathered and wound into a glass fiber strand. During the forming process the applicator speed was varied and the strand was collected on a twelve inch collet. The presence or absence of throw-off was observed and the LOI (Loss on Ignition) was obtained for the various applicator speeds. The results showing reduced throw-off at adequate speeds are shown in the Table II below.

TABLE II

| Applicator Speed | 21.34 percent binder solids degree of throw-off | LOI |
|---|---|---|
| 21 feet per minute | no throw-off | 1.35% |
| 30 feet per minute | very, very slight throw-off | 2.08% |
| 38 feet per minute | very slight throw-off | 2.39% |

EXAMPLE III

The method of mixing the size composition of Example I was used in this example to make a 5 gallon (18.9 liters) batch according to the formulation below:

| Component | Formulation Amounts |
|---|---|
| gamma-methacryloxypropyltrimethoxysilane (A-174) | 0.148 kilograms |
| Water for A-174 | 1.498 liters |
| Acidic Acid | 2 milliliters |
| Total | 1.65 liters |
| Polyester Resin (RS 5974) | 1.60 kilograms |
| Water | 2.60 liters |
| Nonionic surfactant (Abex 18S) | 0.134 kilograms |
| Tricresylphosphate (Phosflex-179A) | 1.34 kilograms |
| After emulsification add gamma-aminopropyltriethoxysilane (A-1100) | 1.34 kilograms |
| Polyester resin (trimellitic anhydride, isophthalic acid, maleic acid and propylene glycol) available as Freeman 40-5018 | 8.66 kilograms |
| Water | 1.89 liters |
| A-1100 | 0.134 kilograms |
| Fuller X-8731 (polyvinylacetate acrylic copolymer) | 1.05 kilograms |
| Water | 1.01 liters |

This formulation was mixed to give a total solids content of 25 weight percent. Another size composition was prepared with a similar formulation as above and in the same manner as Example III, except the components were combined in an amount to give a 30 weight percent solids content.

A 25 weight percent and 30 weight percent high solids size composition was used to treat K-37 glass strands as the glass fiber strand was prepared from glass fibers in a conventional manner at varying applicator speeds while the throw-off of the size composition was observed as the glass fiber strands were wound on a 12 inch collet. Also the LOI was obtained for each varied speed of the applicator. The results showing reduced throw-off at adequate speeds with satisfactory LOIs are presented below in Table III.

TABLE III

| Applicator Speed | Degree of throw-off | LOI |
|---|---|---|
| 25 percent size composition | | |
| 15.5 feet per minute | no throw-off | 1.81% |
| 17.5 feet per minute | no throw-off | 2.10% |
| 20 feet per minute | no throw-off | 2.52% |
| 30 percent size composition | | |
| 7 feet per minute | no throw-off | 1.81% |
| 8 feet per minute | no throw-off | 2.8% |
| 10 feet per minute | no throw-off | 3.4% |

EXAMPLE IV

An alternative embodiment size composition in a five gallon (18.9 liter) batch was made from the following formulation:

| Component | | Amount | |
|---|---|---|---|
| Portion #1 | gamma-methylacryloxypropyl trimethoxy silane (A-174) | 160 | gm |
| | water | 1600 | ml |
| | acitic acid | 1 | ml |
| Portion #2 | polyester resin A containing free carboxyl groups from trimelletic anhydride | 2296 | gm |
| | gamma-aminopropyl triethoxysilane (A-1100) | 100 | gm |
| | Nonionic surfactant (Abex 185) | 100 | gm |
| | Tricresyl phosphate (Phosflex 179A) | 100 | gm |
| | Water | 3300 | ml |
| Portion #3 | polyester resin B not containing free carboxyl groups | 3931 | gm |
| | water | 3000 | ml |
| Portion #4 | melamine formaldehyde resin (Resmene X-970) | 437 | gm |
| | water | 1000 | ml |
| Portion #5 | polyvinylacetate acrylic (Fuller X-8731) copolymer | 800 | gm |
| | water | 1802 | ml |

The sizing composition was prepared by first preparing Portion #1. Then Portion #2 was prepared by adding the nonionic surfactant and tricresylphosphate to water. Then concentrated 2-aminopropyl-triethoxysilane in the unhydrolyzed form was added to polyester resin A and mixed for approximately 10 minutes. The water was slowly added to the resin silane mixture which was mixed for about 30 minutes using an Epperbach mixer to form an emulsion. The emulsion was added to a mix tank.

The diluted polyester resin B was added to the tank containing the emulsion. Then Portion #1 was added to the tank. Portions #4 and 5 were prepared and added to the tank. The mixture was stirred for one hour to produce a sizing composition having 22 percent by weight solids.

The sizing composition was used in forming K-37/2 glass fiber strand to product 18 forming packages. The forming packages were dried at 285° F. (141° C.) for 11 hours. The dried glass fiber strand was used to produce roving that had good wet out and wet through properties.

EXAMPLE V

A migration study was run on a forming package, where the glass fiber strand was treated with a size composition containing a high solids amount of 25 percent by weight solids. The results of the migration study are presented in the Table IV below.

TABLE IV

| Location in Forming Package | LOI |
|---|---|
| Inside package after end finding | 2.3% |
| 500 yards into package | 2.4% |
| 1,000 yards into package | 1.2%* |
| center of package | 2.2% |
| 1,000 yards from outside package | 2.2% |
| 500 yards from outside package | 2.3% |
| outside package after end finding | 2.3% |

*This value can be disregarded due to error in measurement.

As seen from the results of Table IV the LOI values are fairly consistant from the inside of the package to the outside of the forming package thereby indicating little if any migration.

In the above examples the polyester resin A made with trimellitic anhydride, was made by the following procedure: 4 moles of propylene glycol, 1 mole of maleic anhydride, and 1 mole of isophthalic acid were charged to a reaction vessel equipped with a stirrer, a heating apparatus, and inner gas inlet, a thermometer to determine the temperature of the reaction and a thermometer placed at the top of the distillation column to determine the temperature of the effluent from the reaction mixture. The above ingredients were esterified to an acid value of 8.2. One mole of trimellitic anhydride was added thereto and reacted with the above formed polyester until a cure time of less than 30 seconds at 220° C. was obtained. The resin was stoichiometrically neutralized with an aqueous triethyl amine solution. The final resin had an acid number of 57.2, a cure time of 28 seconds, a nonvolatile content of 30 percent a Gardner-Holt viscosity of A-1 at 25° C., a Gardner color of one, and a pH of 7.4. Of particular importance is the cure time of the final resin so that when such a resin is incorporated into a sizing composition and the fibers are sized therefrom subsequent heating will condense the free carboxylic acid in the polyester resin. The cure time is determined by heating the polyester at 200° C. and measuring the time required for gelatin. Generally in the above type of polyester an acid value from 30 to 90 preferably 40 to 60 is necessary to obtain proper solubilization and cross-linking of the sizing composition.

The polyester resin B not made with trimellitic anhydride, was made in the following manner. A polyester resin was made in the conventional manner using 6 moles of maleic anhydride, 4 moles of phthalic anhydride, 10.5 moles of ethylene glycol, 0.2 mole of Carbowax ® 1540W a high molecular weight polyethylene glycol. The components were condensed to an acid value between 18 and 26 and a Gardner viscosity of 0 to Q at 60 percent resin solid in ethyl Cellusolve ®. Seventy-five parts of the polyester resin are mixed with 25 parts of ethyl Cellusolve ®, 0.1 part of 2,6 di-tertiarybutylparacresol as an antioxidant, and 0.002 parts of methylquinone.

In the preparation of the size composition having a high solids content, the ingredient Abex ® 18S anionic emulsifier has a solids content of 35 plus or minus 1.7 and a pH of 7.5 to 8.5 at 25° C. and is sold by Alcolac Chemical Corporation.

When the glass fibers were formed and treated with the size composition having the high solids content of the examples they were drawn in a conventional manner. This includes drawing the glass fiber from a bushing and treating the fibers with the size composition of the present invention during the formation. And the individual size filaments were then gathered into strands and collected on a forming tube mounted on a 20.32 centimeter (12 inch) collet which was rotating at about 4,100 revolutions per minute.

The foregoing described invention of a high solids content size composition from 18 to 40 percent by weight solids for a size composition having a polyester resin with free carboxyl groups and an aminofunctional silane is an improvement in the art since it leads to several advantages. The advantages include higher efficiencies for size composition use, reduced migration in forming packages of glass fiber strand, less drying or lower curing temperature and time of the glass fiber forming package because it contains less moisture, improved house keeping and reduced cleaning time because of less waste and throw-off of the size composition, and the capacity of using higher LOIs on the glass fibers. The invention of the high solids size composition and method for making same can be used with any polyester resin having free carboxyl groups and with any amino-functional silane along with many other additional additives as has been discussed in the foregoing description.

We claim:

1. Glass fibers having thereon the dried residue of a sizing composition, comprising:
   (a) an unsaturated water dispersible, and insoluble polyester resin in an amount of about 5 to about 15 weight percent of the aqueous sizing composition;
   (b) a plasticizer in an amount in the range of about 0.5 to about 1.5 weight percent of the aqueous sizing composition;
   (c) an acid base salt reaction product formed from an amino functional silane coupling agent in unhydrolyzed or partially hydrolyzed form in an amount of about 0.1 to about 1 weight percent of the aqueous sizing composition and a water solubilized condensation, crosslinkable ethylenically unsaturated polyester resin having free carboxyl groups in an amount of about 5 to about 15 weight percent of the aqueous sizing composition, where the polyester resin having free carboxyl groups and amino-silane are combined to favor the reaction between the free carboxyl groups of the polyester resin and the amine groups of the silane over the formation of silane dimers by combination of hydrolyzed silanes;
   (d) a second silane coupling agent to control the wetting of said glass fibers by said first silane coupling agent present in an amount of about 0.1 to about 1.0 weight percent of the aqueous composition;
   (e) a thermoplastic polymer being of sufficiently low molecular weight to impart pressure sensitive adhesive characteristics to said sizing composition present in an amount of about 2 to about 7 weight of the aqueous sizing composition; and
   (f) an amount of water to bring the total solids of the sizing composition within the range of about 18 to about 40 weight percent.

2. A method of forming glass fibers comprising:
   forming glass fibers from molten cones of glass at the tips of orifices in a bushing by attenuation;
   sizing said glass fibers with an aqueous sizing composition, comprising:
   about 5 to about 15 weight percent of a unsaturated water insoluble polyester resin;
   about 0.5 to about 1.5 weight percent of a plasticizer;
   about 0.1 to about 1.0 weight percent of a methacryloxyalkyltrialkoxy silane to promote adhesion between said glass fibers and resinous material;
   an acid base salt reaction product formed from about 0.1 to about 1.0 percent by weight of amino-containing silane coupling agent and a water solubilizable condensation, crosslinkable, ethylenically unsaturated polyester resin having free carboxyl groups in an amount of about 5 to 15 weight percent of the aqueous sizing composition, where the polyester resin having free carboxyl groups and amino silane are combined to favor the reaction between the free carboxyl groups of the polyester and the amine groups of the silane over the formation of silane dimers by combination of hydrolyzed silanes;
   about 2 to about 7 weight percent by weight of an acrylic thermoplastic polymer being of sufficient low molecular weight to impart pressure sensitive adhesive characteristics to said sizing composition; and
   an amount of water to give a sizing composition containing an amount of total solids in the range of about 18 percent to about 40 weight percent; and
   gathering said fibers into strands; and
   collecting said glass fiber strands.

3. Method according to claim 2 wherein the glass fiber strand after being collected is dried at a temperature in the range of about 100° C. to about 150° C. for a time of about 1 to about 20 hours.

4. Method according to claim 3 wherein the dried glass fiber strand is post-baked at a temperature in the range of about 125° C. for a period of time of about 1 to about 10 hours.

* * * * *